May 21, 1963
E. V. BERRY
3,090,712
METHOD OF PRESTRESSING A CRANKSHAFT AND CRANKSHAFT
FORMED AS A RESULT THEREOF
Filed Feb. 2, 1960
2 Sheets-Sheet 1
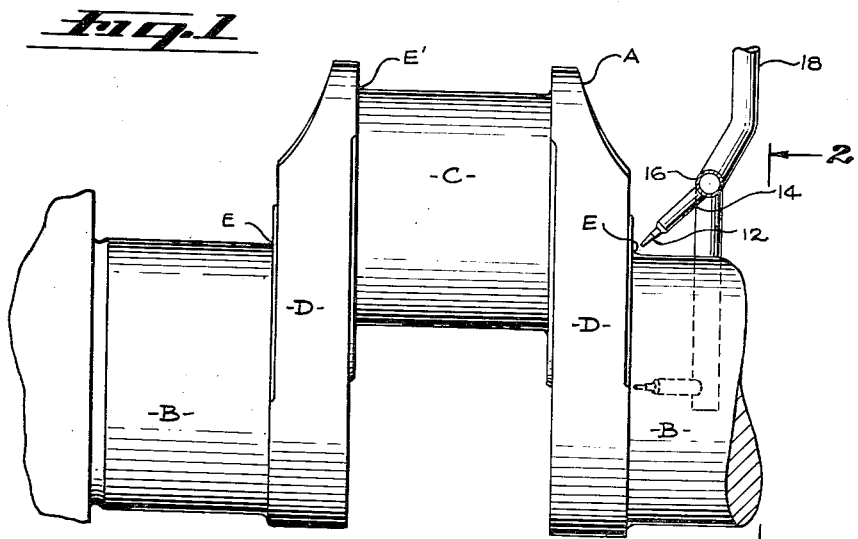
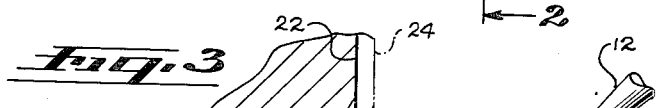
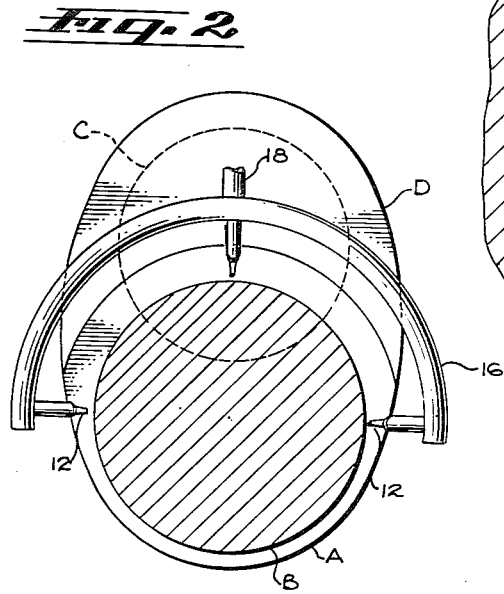
ERNEST V. BERRY
INVENTOR
BY
ATTORNEY

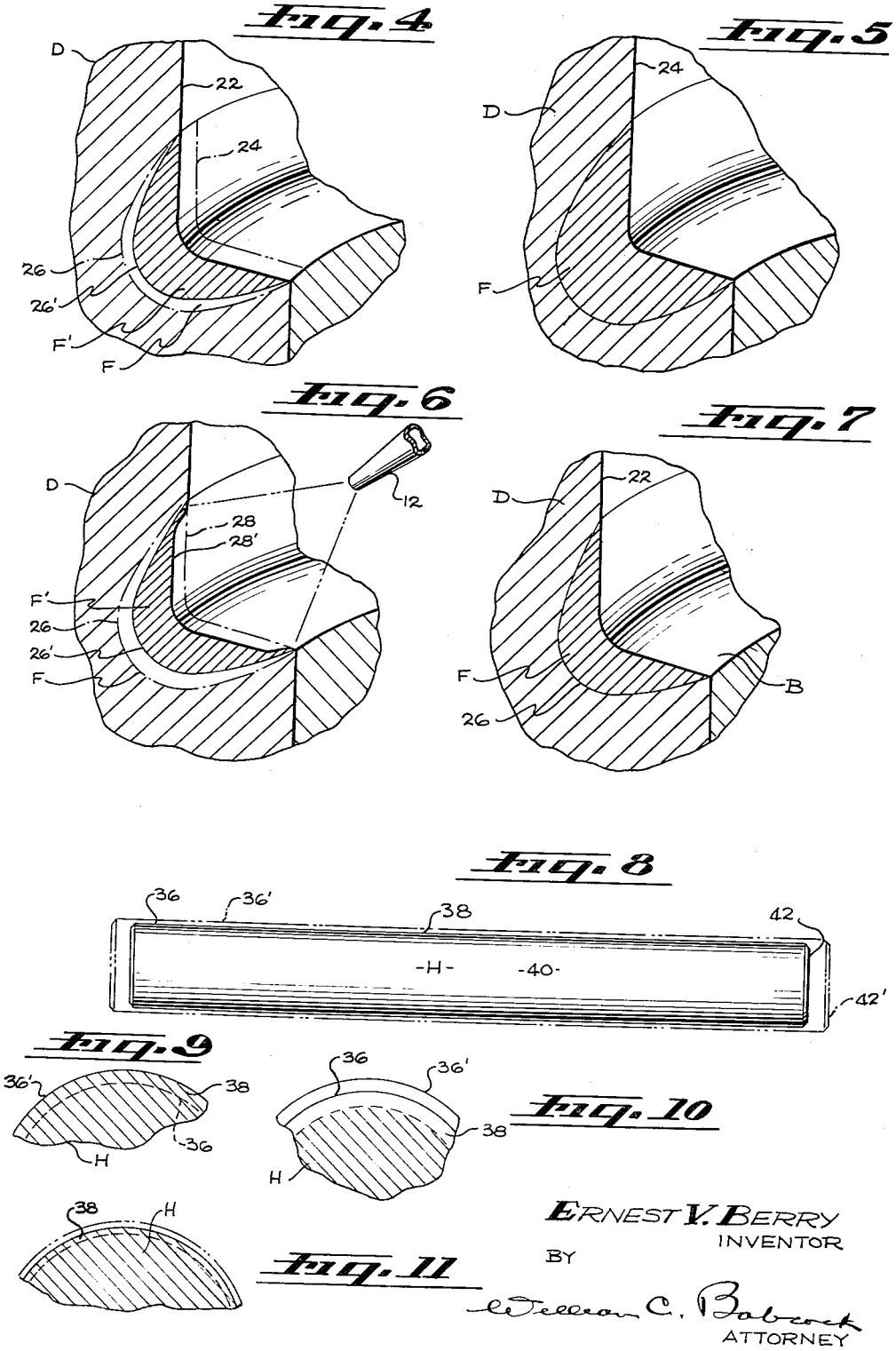

United States Patent Office 3,090,712
Patented May 21, 1963

3,090,712
METHOD OF PRESTRESSING A CRANKSHAFT AND CRANKSHAFT FORMED AS A RESULT THEREOF
Ernest V. Berry, 1717 E. Slauson Ave., Los Angeles, Calif.
Filed Feb. 2, 1960, Ser. No. 6,135
1 Claim. (Cl. 148—146)

The present invention relates generally to the field of metal treating, and more particularly to a method of prestressing, under compression, the surface portions of mechanical elements to minimize the hazard of fatigue failure thereof.

In the past, a common source of mechanical failure has been due to the breaking or fracturing of the metallic surfaces of mechanical elements due to the repeated stresses to which they have been subjected. As is well known, a metal surface is not perfectly smooth but contains microscopic crevices and irregularities which often serve as the origin of cracks or fractures in the metal when it is repeatedly subjected to stresses. One specific example wherein a mechanical element may fail is in the fillets on a crankshaft, for at these positions the metal forming same is subjected to repeated torsional, tensional, and compressive stresses. To minimize breaking or fracturing of crankshafts at the fillet portions thereof, various remedies have been proposed in the past, but these remedies have not proved to be commercially successful, nor have they provided the complete solution to the problem.

A major object of the present invention is to provide a method and mechanical elements formed as a result of practicing this method in which all or a desired portion of the surface area of the mechanical element is placed under compression with the result that should microscopic crevices or cracks formed therein tend to develop fractures, these embrionic fractures will be immediately closed due to the compressive forces exerted on the surface portion of the metal in which they tend to form.

Another object of the invention is to provide a method of the nature described, where by means of a differential in temperature, the metal defining the surface portion of a mechanical element is cooled and stretched beyond its yield point, with the cooled portion of the element being under compression when the element as a whole is permitted to return to room temperature.

A further object of the invention is to provide a method of the character described that substantially eliminates all microscopic fissures and porosities from the treated surface portion of a mechanical element, and strengthens and compacts the surface of the element due to the prestressing to which it is subjected in carrying out the method.

Yet another object of the invention is to supply a process of prestressing the surface portions of a mechanical element under compression by a relatively simple operation that requires no elaborate equipment therefor, or the use of highly skilled personnel.

A still further object of the invention is to provide a method whereby the surface portion of a mechanical element can be prestressed to the desired depth, and with there being no sharp line of demarcation between the prestressed and unstressed portions of the element.

These and other objects and advantages of the invention will become apparent from the following description thereof when taken in conjunction with the accompanying drawings illustrating the apparatus by which it may be carried out, in which:

FIGURE 1 is a side elevational view of a portion of a crankshaft showing a fillet being stressed under compression after a differential in temperature has been established;

FIGURE 2 is a vertical cross-sectional view of the crankshaft taken on line 2—2 of FIGURE 1 showing the location of the cooling nozzles;

FIGURE 3 is an enlarged fragmentary side elevational vew of a fillet portion of a crankshaft showing the manner in which same is prestressed under compression;

FIGURE 4 is a diagrammatic view of a portion of a crankshaft fillet prior to establishing a differential in temperature between the shaft and the surface portion thereof;

FIGURE 5 is a diagrammatic view of a crankshaft fillet after same has been heated to a predetermined temperature;

FIGURE 6 is a diagrammatic view of a crankshaft fillet after the crankshaft has been heated and the fillet is subjected to a cooling action to establish a differential in temperature;

FIGURE 7 is a diagrammatic view of a crankshaft fillet after the shaft has been heated and cooled, with the fillet being subjected to a differential in temperature during this operation to prestress the fillet under compression;

FIGURE 8 is a side elevational view of an elongate shaft or axle both prior to and after heating;

FIGURE 9 is a fragmentary transverse cross-sectional view of the shaft shown in FIGURE 8 after it has been heated;

FIGURE 10 is a fragmentary transverse cross-sectional view of the shaft shown in FIGURE 8 after it has been heated and a differential in temperature established on the surface portion thereof; and FIGURE 11 is a fragmentary transverse cross-sectional view of the portion of the shaft shown in FIGURE 8 after it has cooled, with the surface portion thereof being under compression due to the maintenance of a differential in temperature thereon during the cooling operation.

Referring to the drawings, it will be seen that the invention is illustrated to show the manner in which a crankshaft fillet is prestressed under compression and also the manner in which the entire surface of an elongate shaft or axle may be prestressed under compression. In FIGURES 1, 2 and 3, a conventional crankshaft A is shown that is rotatably supported by means (not shown), with this crankshaft including main bearings B and pins C which are supported on webs D that extend outwardly from the bearings. Circumferentially extending fillets E are formed at the junction of webs D and bearings B.

The cooling apparatus includes a number of spaced nozzles 12 that are adjustably supported by suitable fittings 14 from a curved header 16. In FIGURE 2 it will be seen that the header 16 is semi-circular in shape, but it will be apparent that it may assume other shapes if desired, such as a full circle.

A conduit 18 connects header 16 to the coolant 20, which coolant may be either a liquid or gas. The above-described apparatus is utilized by rotating the crankshaft A by means (not shown) and directing the coolant 20, whether a gas or liquid, onto the fillet E which is to be prestressed under compression. Crankshaft A also has fillets E′ formed at the junction of the pin C and webs D, which fillets may likewise be prestressed under compression as will hereinafter be described, but when these fillets are so prestressed, the crankshaft must be eccentrically rotated to cause the pin C to rotate about a fixed axis.

The nozzles 12 may be any of the commercially available types so long as they direct the coolant 20 onto the surface area of the element to be prestressed, such as shown in FIGURE 2. Where a relatively large surface area is to be prestressed, nozzles 12 may be of the fog nozzle type which furnishes a relatively large spray volume. In carrying out the process, the crankshaft A is heated to a predetermined elevated temperature, and as can be seen in FIGURES 3–7, the crankshaft expands dimensionally as a result thereof from the line 22 (FIGURE 3) to the phantom line 24, as shown. After the crankshaft is so heated it is rotated and the coolant 20 is discharged onto the fillet E.

Due to the rotation of crankshaft A and coolant 20, a circumferentially extending zone F of fillet E is cooled. In transverse cross section this zone F is generally crescent-shaped, and prior to cooling, is defined by the curved line 26 and a second external curved line 28, which is a continuation of line 24, as can best be seen in FIGURE 3.

However, during the cooling operation the zone F tends to contract dimensionally to the size of zone F', which in transverse cross section (FIGURE 3) is defined by a curved internal line 26' and an external curved line 28'. Actually, the volume of zone F is small in comparison to the massive volume of web D and main bearing B of which it forms a part, and the tendency of the zone to contract has little effect on the expanded dimensions of the web and main bearing. Thus, zone F' is not attained within crankshaft A during the cooling operation, but instead the metal which normally forms zone F' is stretched beyond its yield point to extend to line 26. The external plane of zone F' is free to move, whereby line 28 defining same moves from the position shown in solid line in FIGURE 3 to that shown in phantom line 28'. Therefore, it will be seen that zone F' has been permanently deformed by stretching to be defined internally by line 26 rather than 26'. The degree of stretch or deformation of zone F' is that space existing between lines 26 and 26' as shown in FIGURE 3.

After zone F' has been expanded to the full extent of zone F, the balance of the crankshaft A is permitted to cool, but the fillet E is also cooled during this operation until a sufficiently low temperature is reached that no plastic flow occurs in zone F'. As it returns from line 24 to line 22, the heated portion of crankshaft A places fillet zone F' under compression, for the fillet portion, instead of being defined internally by line 26' is defined by line 26.

The method by which the fillet E is placed under compression is diagrammatically shown in FIGURES 4–7 inclusive, which augments the description above given. It will be apparent that the basis for this method resides in a differential in pressure established between the fillet and the balance of the crankshaft. As mentioned herein, this temperature differential is attained either by heating the crankshaft and cooling the fillet, or leaving the crankshaft A at room temperature and subjecting the fillet to an extremely low temperature, as by spraying liquid air or other liquified gases thereon.

In the above description of the present method of prestressing under compression, only a portion of a mechanical element, namely a crankshaft, has been discussed. However, this method is not limited to a portion of an element, but is adapted for use in stressing the entire piece. In FIGURE 8 an elongate crankshaft H is shown which can be expanded by heating from the dimensional line 36 to the dimensional line 36'. Crankshaft A can then be heated to a predetermined elevated temperature and the external surface thereof defined by line 36' cooled sufficiently that the surface portion 38 of the crankshaft contracts to the extent that it is stressed beyond its yield point and is unable to compress the solid heated core 40 thereof. Crankshaft H is then permitted to cool, but during this cooling, the expanded surface thereof is maintained at a lower temperature than that of the shaft core whereby the longer external surface 38 is placed under compression as core 40 returns to its normal length after cooling. In effect, in cooling, surface portion 38 is deformed to a greater length than the interior heated core, which as it contracts then places compression on surface portion 38 in much the same manner as occurs in the case of the fillet portion just described. Surface 38 is not only under compression radially as shown in FIGURE 10, but longitudinally as well, for the end portions of the shaft tend to move from positions 42' (FIGURE 8) to positions 42 as shown.

The method by which the invention is practiced has been described in detail as well as the prestressed mechanical elements formed as a result thereof, and a further description thereof need not be repeated.

Although the process of treating a mechanical element and the products formed as a result thereof in accordance with the above description has proved to be highly satisfactory, it is to be understood that the applicant is not to be limited to the precise steps in practicing the invention as above described, but that the process as described herein is merely illustrative of the manner in which it can be carried out, and the applicant is not limited to the details thereof other than as defined in the appended claim.

I claim:

A method of treating a metallic crankshaft to place the exterior surfaces of the fillets thereof permanently under compression to minimize fatigue failure, comprising:

(a) heating said crankshaft to a predetermined elevated temperature;
(b) rotating said crankshaft;
(c) discharging a plurality of streams of coolant onto said fillets for cooling the metal defining same during rotation of said crankshaft;
(d) continuing to cool the metal defining said fillets until the differential between said predetermined elevated temperature and that of the metal defining said fillets is such as to cause said metal defining said fillets to stretch beyond its yield point and permanently deform to have an external surface area greater than that said fillets initially had prior to said heating;
(e) allowing said crankshaft to return to room temperature; and
(f) continuing to cool said metal defining said fillets as said crankshaft returns to room temperature and said crankshaft contracts in volume, with said contraction placing the metal defining said permanently deformed fillets under compression.

References Cited in the file of this patent
UNITED STATES PATENTS

| | | |
|---|---|---|
| 2,178,281 | Judge | Oct. 31, 1938 |
| 2,213,241 | Denneen et al. | Sept. 3, 1940 |
| 2,801,193 | Parker et al. | July 30, 1957 |